(12) United States Patent
Javaruski

(10) Patent No.: US 9,541,217 B1
(45) Date of Patent: Jan. 10, 2017

(54) WATER RESTRICTING DEVICE FOR LEVER ACTUATED FAUCETS

(71) Applicant: Russell Javaruski, Lakewood, NJ (US)

(72) Inventor: Russell Javaruski, Lakewood, NJ (US)

( * ) Notice: Subject to any disclaimer, the term of this patent is extended or adjusted under 35 U.S.C. 154(b) by 0 days.

(21) Appl. No.: 14/756,050

(22) Filed: Jul. 27, 2015

(51) Int. Cl.
F16K 35/02 (2006.01)
F16K 31/60 (2006.01)
E03C 1/04 (2006.01)
E03C 1/02 (2006.01)

(52) U.S. Cl.
CPC ........... *F16K 35/027* (2013.01); *E03C 1/0412* (2013.01); *F16K 31/602* (2013.01); *E03C 2001/026* (2013.01)

(58) Field of Classification Search
CPC .... F16K 35/027; F16K 31/602; E03C 1/0412; E03C 2001/026
USPC ........... 251/89, 90, 101, 102, 111, 115, 107, 108,251/109, 75, 336, 369; 222/153.04, 153.11, 222/153.13, 153.14
See application file for complete search history.

(56) References Cited

U.S. PATENT DOCUMENTS

| | | | |
|---|---|---|---|
| 6,880,797 B2 * | 4/2005 | Yui | F16K 35/025 251/103 |
| 2008/0210659 A1 * | 9/2008 | McKinney | A45F 3/16 215/382 |
| 2010/0258203 A1 * | 10/2010 | Meyer | F16K 35/025 137/377 |
| 2015/0233099 A1 * | 8/2015 | Holmes | F16K 35/14 251/90 |

\* cited by examiner

*Primary Examiner* — Michael R Reid
*Assistant Examiner* — Patrick Williams
(74) *Attorney, Agent, or Firm* — Russell Jararuski

(57) ABSTRACT

A water conservation device for lever actuated faucets having a pair of donut-shaped rings formed of a non-abrasive material, the apertures of the donut-shaped rings of such a dimension that they are slidably received onto a faucet head of a faucet associated with a sink and the lever of the faucet which activates the flow and termination of water, the pair of donut-shaped rings having secured there between a length of expandable/retractable band fabricated from suitable material which is expandable and stretchable upon upward pressure on the lever handle of the faucet to allow the lever handle to open the valve and initiate the flow of water, the retractable band having sufficient elasticity to exert downward pressure on the lever moving the lever downwardly to close the valve and terminate flow.

8 Claims, 3 Drawing Sheets

WATER RESTRICTING DEVICE FOR LEVER ACTUATED FAUCETS

RELATED APPLICATIONS

Applicant claims the benefit of provisional application Ser. No. 62/070,861, filed Sep. 8, 2014.

BACKGROUND OF THE INVENTION

1. Field of the Invention

The present invention relates to water conservation, and in particular, to a water restriction device which is slidably adaptable onto a faucet which is lever actuated, the device having engagement ends engaging both the faucet and the lever with an interconnecting retractable expandable band for automatically closing the lever and terminating the water flow if the user's hand is removed from the lever.

2. Description of the Prior Art

One of the most precious resources which we have is fresh potable water, and the conservation of it has become a priority, particularly in those areas which experience both short term and long term drought conditions. The conservation effort has become so important that even the most mundane water using devices have been improved upon in recent years to reduce the amount of water which they require. For instance, flush toilets have become more and more efficient with respect to the amount of water required in order to flush them, as have washers and dish washers.

One area which has not undergone any significant improvement is the faucet associated with bathroom and kitchen sinks, and utility sinks. Many times a user will initiate the flow of water and then for convenience sake let the water run for a period of time when it is not actually needed or required. There therefore has been a need for some sort of device which will automatically operate on a faucet to terminate the flow automatically.

Applicant's device has particular attention to those types of faucets which are actuated by a lever mechanism associated with the faucet, the lever mechanism being raised to initiate flow and turned from the left to the right, depending upon the desire for hot or cold water. The flow is halted when the lever mechanism is moved downwardly closing the valve. In this type of faucet, the lever must be manually operated by the user and it is therefore possible that the user can move the lever upwardly to initiate the flow of water and let it remain in an up, open position, for the flow of water when the actual flow is not required. Until the user actually initiates a downward force on the lever, the faucet will continue to run. Applicant's device is a simple mechanism adaptable to fit on both the faucet head and the lever of the aforesaid type of faucets such that when the user's pressure on the lever upwardly in order to open the valve and initiate flow of water is removed from the lever, the device will automatically draw the lever downwardly to a closed position and terminate the flow of water.

OBJECTS OF THE INVENTION

An object of the present invention is to provide for a novel device which conserves water from faucets.

A still further object of the present invention is to provide for a novel device which is removably securable onto a lever actuated faucet to automatically close the faucet when upward pressure on the lever is removed.

A still further object of the present invention is to provide for a novel device for water conservation which is adaptable to many different types of lever operated faucets and sizes thereof.

SUMMARY OF THE INVENTION

A water conservation device for lever actuated faucets having a pair of donut-shaped rings formed of a non-abrasive material, the apertures of the donut-shaped rings of such a dimension that they are slidably received onto a faucet head of a faucet associated with a sink and the lever of the faucet which activates the flow and termination of water, the pair of donut-shaped rings having secured there between a length of expandable/retractable band fabricated from suitable material which is expandable and stretchable upon upward pressure on the lever handle of the faucet to allow the lever handle to open the valve and initiate the flow of water, the retractable band having sufficient elasticity to exert downward pressure on the lever moving the lever downwardly to close the valve and terminate flow. If the user wishes more water, then user must then initiate upward pressure on the lever, and hold the lever in position for the length of time the user requires the flow.

BRIEF DESCRIPTION OF THE DRAWINGS

These and other objects of the present invention will become apparent, particularly when taken in light of the following illustrations wherein.

DETAILED DESCRIPTION OF THE INVENTION

Figures 1, 2:
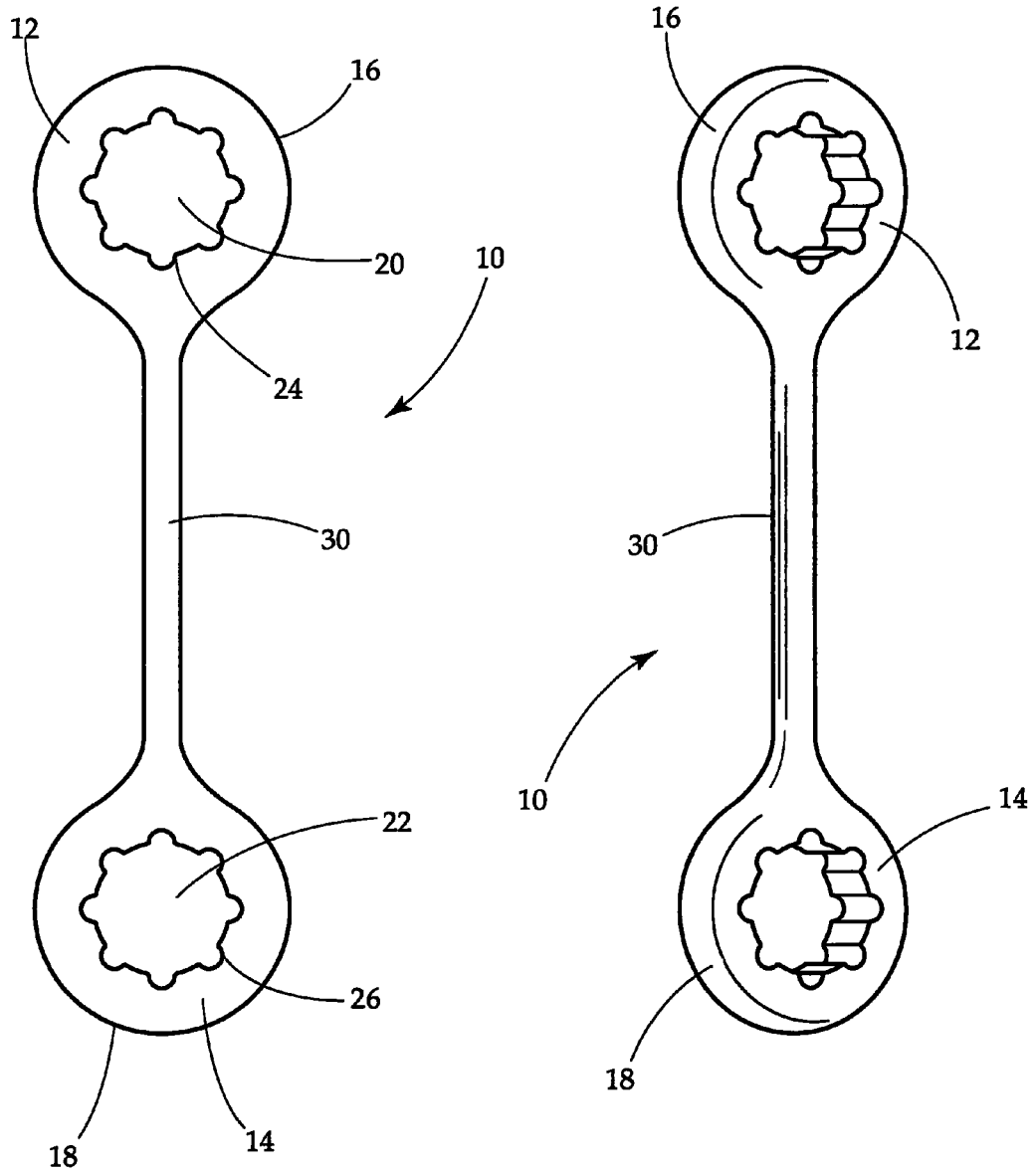
FIG. 1 is a front view of the water conservation device of the present invention.
FIG. 2 is a perspective view of the water conservation device of the present invention.

FIG. 1 is a front view of a first embodiment of the water restricting device of the present invention, and FIG. 2 is a perspective view. The water restricting device 10 is formed with two securing rings 12 and 14. Securing rings 12 and 14 are donut-shaped in configuration having an outer surface 16 and 18 and an aperture there through 20 and 22, thus defining an inner wall surface 24 and 26. Secured between the securing rings 12 and 14 is an expandable/retractable, and flexible band or strap 30. Rings 12 and 14 can be fabricated from any suitable material that is non-abrasive and preferably rather soft and malleable. Rings 12 and 14 are designed to slip over a faucet head 40 and its lever activation 42, which are normally located on the edge of a sink 44.

Since many faucets are designed to be aesthetically pleasing to the homeowner, they are oftentimes constructed of stainless steel, nickel steel, or other attractive and aesthetic metals, and is therefore desirous in installing and utilizing the water restricting device 10 of the present invention that it not scratch, mar, or abrade the surfaces of the faucet or lever. It is further desirous that the expandable/retractable flexible band member be of unitary construction with the rings 12 and 14 for durability and ease of installation. The apertures 18 and 20 associated with each ring 12 and 14 could be sized to fit the specific dimensions of a faucet and lever 40 and 42 or the rings 12 and 14 being constructed or fabricated of malleable material such as a rubber-like substance, or malleable polymer, could have an aperture 18 and 20 which was manipulative to fit snugly over the faucet head 40 and the lever handle 42. As illustrated in FIG. 2 the inner walls 24 and 26 of rings 12 and 14 may be knurled or irregular for better fit and improved grip.

Figure 3:
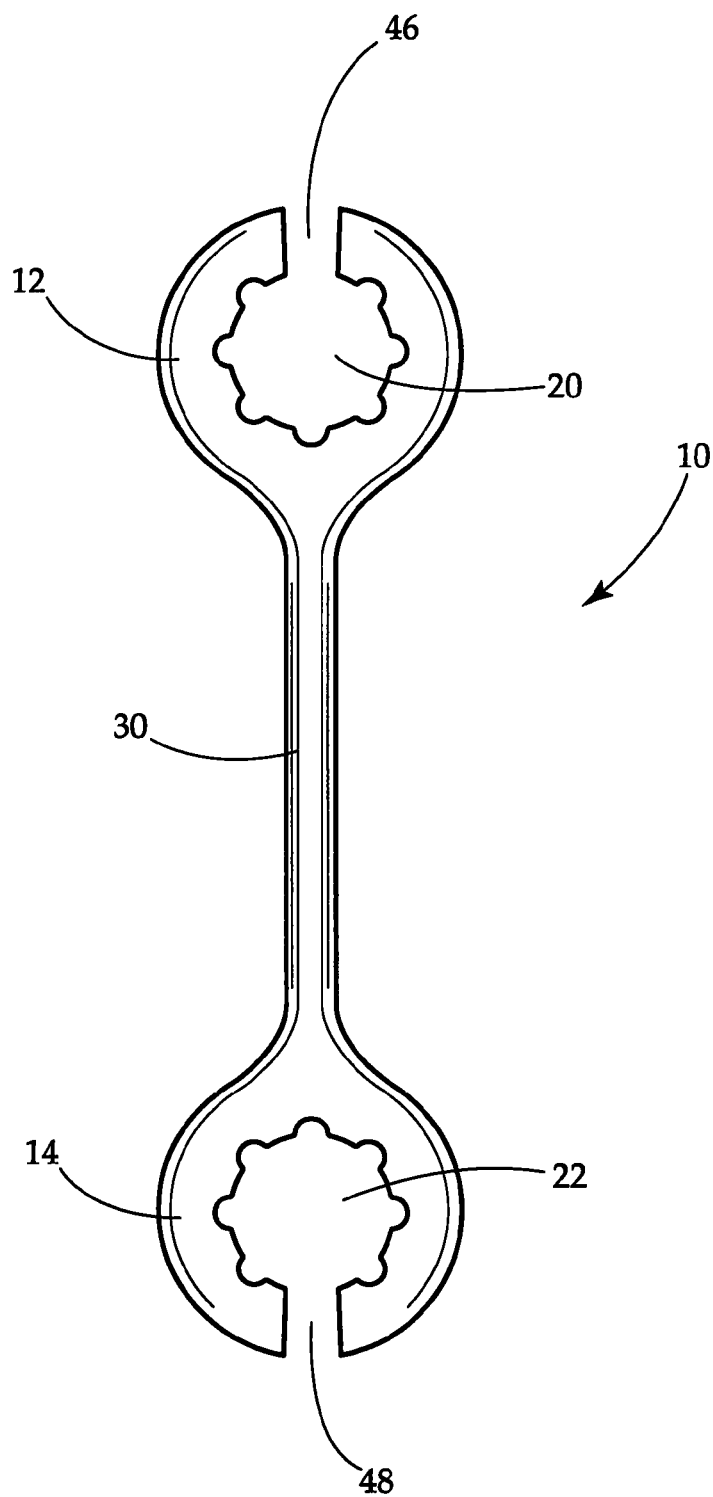
FIG. 3 is a front view of a second embodiment of the water conservation device of the present invention.
Figure 4:
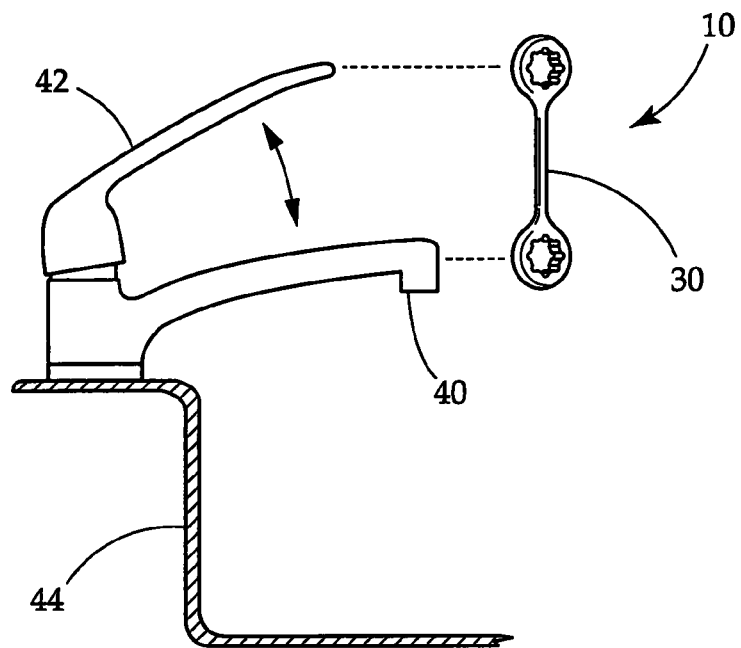
FIG. 4 is a side view of the water conservation device of the present invention prior to securing on a faucet head and lever handle.

FIG. 3 is illustrative of the second embodiment of the water conservation device 10 of the present invention. It is the same basic design as the water retention device as illustrated in FIG. 1 and functions in the same way as does water retention device 10 as illustrated in FIGS. 3 and 4. The difference is that the rings 12 and 14 are not of a continuous donut shape, but rather are formed with gaps 46 and 48. This allows for several advantages. First, it would allow easier installation. Second, it would allow, depending upon the material of construction to allow the opposing separated arms of the rings 12 and 14 to be expanded to fit faucets and levers of varying circumference. And finally, depending upon the material of fabrication, would allow the user to insert the rings directly over the faucet or the lever without having to slide the rings onto the faucet head or the lever from the ends thereof.

Figure 5:
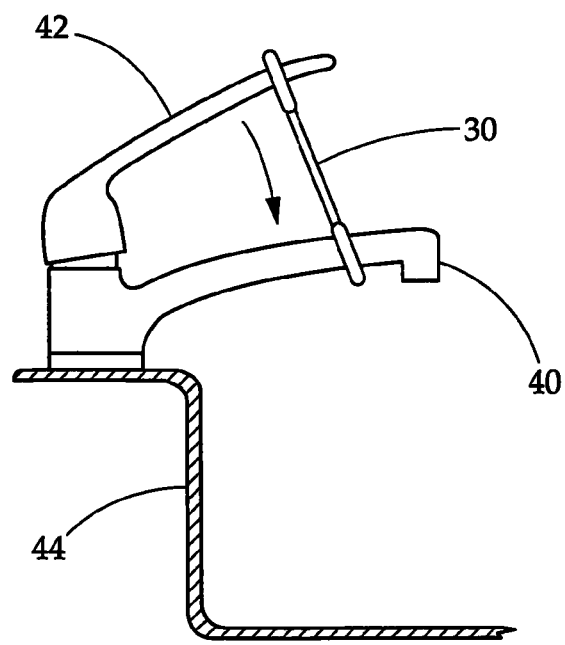
FIG. 5 is a side view of the water conservation device attached to the faucet head and the lever handle.

FIG. 4 illustrates the water restricting device 10 with respect to a faucet head 40 and lever 42 before installation and FIG. 5 illustrates the water restricting device 10 secured to the faucet head 40 and the lever 42 when in actual use. In most instances, the lever handle 42 is in a down or closed position when there is no flow of water desired from the faucet head 40. When flow is desired, the lever handle 42 is pivoted upwardly to open the valve and initiate water flow through the faucet head 40 and into the sink 44. The lever handle 42 is normally designed and constructed to remain in the raised position without the aid of a user. If the user wishes to disrupt or end the water flow, the user applies downward pressure on the lever arm 42 moving it downwardly towards the faucet head 40 to close the valve and disrupt the flow of water.

The flow restricting device of the present invention with its expandable/retractable flexible band member 30 is designed to automatically supply the downward pressure as illustrated in FIG. 4 when the user no longer has contact with the lever arm 42. This means that the user can initiate water flow by physically holding the lever in an open upward position, and removal of the user's hand pressure automatically initiates a downward retractable pressure by the water restricting device 10 causing the lever handle to move downwardly and disrupt the flow of water by closing the valve.

Therefore, while the present invention has been disclosed with respect to the preferred embodiments thereof, it will be recognized by those of ordinary skill in the art that various changes and modifications can be made without departing from the spirit and scope of the invention. It is therefore manifestly intended that the invention be limited only by the claims and the equivalence thereof.

I claim:

1. A water conservation device for lever-actuated faucets comprising:

a pair of donut-shaped rings formed of a non-abrasive material, a respective aperture of each donut-shaped ring having a dimension such that they are slidably, frictionally received on a faucet head of a lever actuated-faucet and on a pressure-activated lever of lever-actuated faucet, said pair of donut-shaped rings secured to each other by a length of band formed of elastomeric, expandable-retractable material, said band configured to stretch upon pressure activation of said lever allowing a flow of water to exit said faucet head, and retract automatically closing said lever and said faucet head absent pressure activation to said lever.

2. The water conservation device in accordance with claim 1 wherein said water conservation device is unitary in structure.

3. The water conservation device in accordance with claim 2 wherein said band securing said pair of donut-shaped rings configured to automatically retract, closing said lever and said flow of water in the absence of upward pressure on said lever.

4. The water conservation device in accordance with claim 3 wherein said pair of donut-shaped rings are formed with a slit in each of said rings, forming a gap allowing said pair of donut-shaped rings to deformably enlarge to accommodate faucets and levers of various diameter.

5. A water conservation device for lever-actuated faucets and comprising:

a pair of donut-shaped rings formed of a non-abrasive material, and having a slit there through, a respective aperture of each donut-shaped ring having a dimension such that they are slidably, frictionally received on a faucet head of a lever-actuated faucet and on a pressure-activated lever of the lever-actuated faucet, said pair of donut-shaped rings secured to each other by a length of band formed of an elastomeric, expandable-retractable material such that said band is configured to stretch upon pressure activation of said lever allowing a flow of water to exit said faucet head, and retract closing said lever and said faucet head absent pressure activation to said lever.

6. The water conservation device in accordance with claim 5 wherein said water conservation device is unitary in structure.

7. The water conservation device in accordance claim 6 wherein said band securing said pair of donut-shaped rings automatically retracts, closing said lever and said flow of water in the absence of upward pressure on said lever.

8. The water conservation device in accordance with claim 7 wherein said pair of donut-shaped rings are formed with said slit in said ring, forming a gap allowing said pair of donut-shaped rings to deformably enlarge to accommodate faucets and levers of various diameter.

* * * * *